United States Patent Office 3,179,712
Patented Apr. 20, 1965

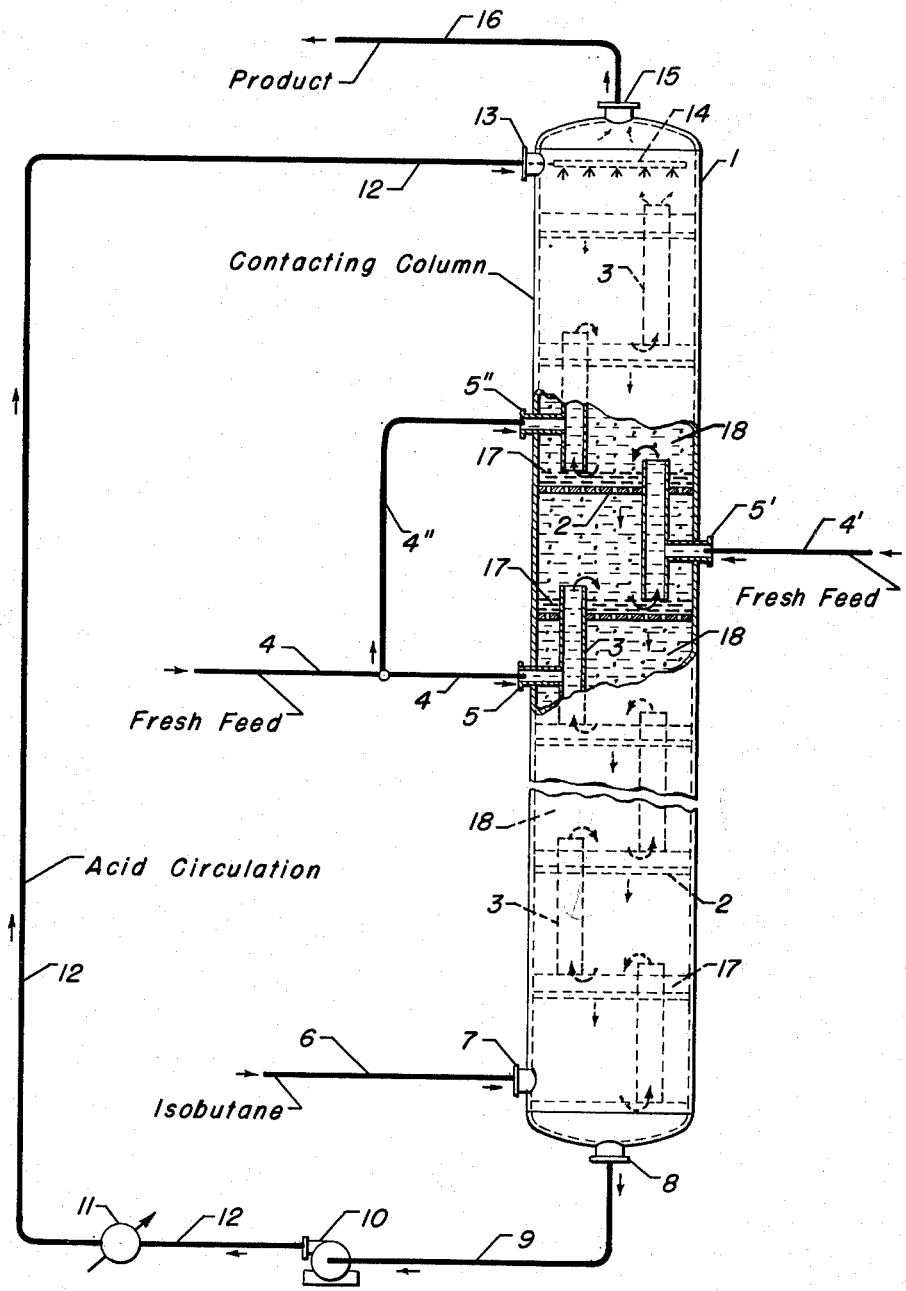

3,179,712
EXTRACTIVE CONDENSATION PROCESS USING A MULTISTAGE COLUMN
Don B. Carson, Mount Prospect, Ill., assignor to Universal Oil Products Company, Des Plaines, Ill., a corporation of Delaware
Filed Nov. 1, 1962, Ser. No. 234,736
9 Claims. (Cl. 260—683.48)

This invention relates to an improved process and apparatus for condensing an alkylatable material with an olefin-acting organic compound in the presence of an acid catalyst, and more particularly relates to the acid-catalyzed liquid phase alkylation of an isoparaffin with an olefin which is carried out in a specially modified multiple deck liquid-liquid extraction column.

In U.S. Patent 2,910,522 there is described a process for condensing an alkylatable material with an olefin-acting organic compound wherein a mixture containing a portion of the alkylatable material and the olefin-acting compound is passed into a vertical multistage contacting column at an intermediate point in the height thereof, acid catalyst is introduced into an upper portion of the column and passed downwardly therethrough, another portion of the alkylatable material is introduced into the column below said intermediate point, and the catalyst and reactants are countercurrently contacted at alkylating conditions within the column, acid being withdrawn from the bottom of the column and condensation product being recovered from the top of the column. This process is termed an "extractive condensation" process because it combines in a single vessel the mechanisms of catalytic condensation and liquid-liquid extraction. The advantages thereof are that, by introducing some of the alkylatable material at a point below the injection of combined feed, the difficulty reactable alkylating agent and intermediate olefins formed in the main reaction zone in the upper portion of the column are further reacted with this separately introduced alkylatable material, and the product is stripped from the downflowing acid, instead of being carried out in the acid phase, thereby reducing sludge formation, increasing product yield, and providing a clean acid recycle stream. Furthermore, by introducing fresh acid into the upper portion of the column above the main reaction zone, the rising condensation product phase is scrubbed thereby and heavy impurities such as substituted alkanes are extracted from the product by the acid and thence returned to the main reaction zone by the descending acid phase. According to U.S. Patent 2,910,-522, this process can be effected in either a packed column or multiplate column; in the latter apparatus the combined feed is introduced into the contacting space between two intermediate trays.

The present invention affords a substantial improvement in the above-described extractive condensation process. In accordance therewith the instant process is carried out in a vertical multiple tray liquid-liquid extraction column wherein the descending acid phase is the discontinuous or dispersed phase and the liquid reactants are maintained in an ascending continuous phase, the latter being passed from each stage to the next superjacent stage through a transfer conduit or fluid upcomer. But the fresh feed comprising olefin-acting organic compound is injected directly into one or more intermediate upcomers, rather than being introduced directly into the catalytic condensation zone proper as taught by the prior art. Several important advantages are provided by this technique. The ascending continuous phase of alkylatable material, having been intimately contacted with the descending acid phase in the lower portion of the column below the point of fresh feed injection, is saturated with acid catalyst but in a very low concentration since the acid is only slightly soluble therein. It has been found that acid catalyst in dilute concentrations will preferentially isomerize certain of the olefin-acting organic compounds present in the feed, such as straight chain butylenes and amylenes, particularly with respect to the shifting of a double bond from the alpha position to a more central position in the molecule, rather than condense them with alkylatable material. The resulting isomerized olefin-acting organic compounds, when subsequently reacted with the alkylatable material in the presence of a higher concentration of acid, yield a superior condensation product. Thus, by injecting the olefin-acting compound directly into an intermediate upcomer—through which is flowing alkylatable material comprising a dilute solution of acid catalyst—the olefin-acting compound is isomerized in the upcomer prior to coming into contact with the bulk of acid catalyst disposed in the next higher stage of the column. Although it is known alkylation art that pre-isomerization of the olefinic feed generally provides a superior condensate, heretofore the step of isomerizing the feed has been carried out in a separate zone and in the presence of special catalysts, all requiring additional and costly plant equipment. The present invention, by means of simple and inexpensive apparatus modifications, permits the best features of pre-isomerization and extractive condensation to be combined in a unitary reaction apparatus.

Secondly, the present invention provides maximum ratios of alkylatable material to olefin-acting compounds at points of reaction while using minimum alkylatable material circulation rate. It is well known that high alkylatable material:olefin-acting compound ratios enhance the quality of the condensate produced. Commercial plants separate excess unreacted alkylatable material from the contactor effluent and recycle it to the contactor, and the large volumes involved in the pumping and fractionation steps represent a substantial utilities cost. As afforded by this invention, for a given expenditure of utilities in producing recycle alkylatable material, a maximum alkylatable material:olefin-acting compound ratio in the reaction zone is maintained and a superior condensate is produced. One or more column upcomers are utilized to thoroughly admix the fresh feed with the total alkylatable material rising in the upcomer before condensation takes place. In conventional processes wherein the fresh feed is admitted directly to the reaction zone this thorough admixture is not accomplished until the condensation reaction has been substantially completed.

It is, therefore, a broad embodiment of this invention to provide a process for effecting the liquid phase condensation of an alkylatable material with an olefin-acting organic compound which comprises introducing said alkylatable material into a lower one of a plurality of vertically spaced contacting zones, each zone being in restricted fluid communication with the next subjacent zone through a multiplicity of horizontally spaced apertures, flowing said alkylatable material upwardly from each zone into the next superjacent zone as a confined stream while maintaining the alkylatable material within each zone in a continuous liquid phase, introducing acid catalyst into an upper one of said contacting zones and passing the catalyst downwardly through said horizontally spaced apertures and through successive subjacent contacting zones as a dispersed phase in countercurrent flow to said continuous phase, injecting feed stock containing said olefin-acting organic compound directly into a selected one of the resulting plurality of vertically spaced upflowing confined streams of alkylatable material which is intermediate the zones to which said alkylatable material and acid catalyst are introduced, recovering a resultant condensation product from the uppermost of said contacting zones, and withdrawing acid catalyst from the lowermost of said contacting zones.

Another embodiment of this invention relates to an improved vertically elongated contacting column having a number of vertically spaced horizontal perforated plates therein dividing the column into a plurality of contacting sections, fluid inlet and outlet means in both the uppermost and lowermost contacting sections, and a plurality of open-ended vertical fluid transfer conduits each extending through a corresponding one of said plates and terminating in adjacent contacting sections, the improvement therein comprising a feed inlet conduit extending through a wall of the column and connecting directly with an intermediate one of said transfer conduits.

The present process and apparatus may be utilized to implement a board variety of acid-catalyzed condensation reactions. Among the more commercially significant is the alkylation of alkylatable hydrocarbons to produce high octane gasoline or alkylated mononuclear or polynuclear aromatics for detergent production. The wide range of operative reactants as well as the chemistry of alkylation reactions is, of course, well known to skilled workers in the field and hence need be only briefly stated here.

The alkylatable material useful in this invention may be a paraffinic material, such as an isoparaffin, having a tertiary carbon atom; typical paraffinic materials include isobutane or higher homologs of isobutane which contain tertiary carbon atoms, for example, 2-methylbutane, 2-methylpentane, 2,4-dimethylpentane, etc. Other alkylatable materials include benzene, toluene, xylene, naphthenes, phenols, cresols, amines, thiophenes, isoparaffinic mercaptans, and the like.

The olefin-acting organic compound useful in this invention may consist of an olefin or a substituted alkyl compound. Typical olefins which may be used include propylene, butene-1, butene-2, isobutylene, pentenes, hexenes, etc. Other olefin-acting organic compounds include propyl chloride, butyl chloride, pentyl chloride, isopentyl chloride, hexyl chloride, butyl bromide, as well as various ethers, aldehydes, acids, alcohols, and the like.

The alkylation reaction is effected in the presence of an acid catalyst, usually a mineral acid catalyst such as hydrogen fluoride or sulfuric acid. Other suitable acid catalysts include phosphoric acid, hydrochloric acid, mixtures of mineral acids with Friedel-Crafts metal halides such as aluminum chloride, aluminum bromide and zinc chloride, mixtures of boron trifluoride and hydrogen halide, and other liquid proton doners. Alkylation conditions include a temperature of from about 40° F. to about 150° F., a pressure sufficient to maintain the reactants in the liquid phase, that is, from about 50 to about 250 p.s.i., an alkylatable material:olefin mol ratio of from about 2 to about 12 or higher, and an acid:reactant liquid volume ratio within the range of from about 1.5 to about 5. Ideally, the reactants combine to yield, as a primary product, a paraffin species of carbon content equal to the sum of the carbon atoms of the olefin and alkylatable material, and through careful control of operating conditions, a primary product yield in excess of 90% is easily obtained.

The apparatus of this invention is a multiple deck liquid-liquid extraction column of the general type described in U.S. Patent 2,647,855, but specially modified through the provision of one or more feed inlet conduits connecting directly with corresponding upcomers which are intermediate in the height of the column. The dynamic operation of the column with respect to hydraulic theory is as described in U.S. Patent 2,647,855, except as otherwise noted below.

This apparatus and the process carried out therein may be more clearly understood with reference to the accompanying drawing which, while representing the best embodiment of the invention, is intended to be illustrative rather than limiting upon the broad scope thereof. For convenience the drawing will be described in relation to a process for alkylating isobutane with butylene, using an HF catalyst, it being understood that the invention is not limited to this particular species of alkylatable material, olefin-acting organic compound or acid catalyst.

In the drawing, the contacting column comprises a vertical housing 1 in the form of a generally vertical tubular column containing a plurality of substantially horizontally disposed perforated plates 2 spaced vertically within and attached to the inner surface of the column which divides the column into multiple vertically spaced contacting sections. A number of vertically spaced, horizontally staggered fluid transfer conduits or upcomers 3 are provided, each extending through a corresponding perforated plate 2 and connecting adjacent contacting stages; the upper end of each conduit 3 is at a higher elevation than the lower end of the next superjacent conduit 3. An isobutane inlet nozzle 7 and an acid outlet nozzle 8 are provided at the lower end of column 1. An acid inlet nozzle 13 communicating with an internal spray head 14, and a product withdrawal nozzle 15 are provided at the upper end of column 1. Three intermediate fresh feed nozzles 5, 5' and 5" extend through the vertical wall of the column and connect directly with their respective transfer conduits 3 which are intermediate in the height of the column, that is, the fresh feed injection upcomers connect vertically adjacent contacting stages which are above the stage to which isobutane is introduced and below the stage to which recirculated acid is introduced.

An isobutane stream, which may comprise recycle isobutane from a downstream product fractionating column admixed with fresh outside isobutane, is introduced through line 6 and nozzle 7 into the lower portion of column 1. A hydrofluoric acid stream is introduced through line 12, nozzle 13 and spray head 14 into the upper portion of column 1. Fresh feed, consisting of a mixture of a minor proportion of butylenes, a limited quantity of an inert diluent such as n-butane and, optionally, a limited amount of isobutane, is injected through line 4 and nozzle 5, line 4' and nozzle 5', and line 4" and nozzle 5" into three intermediate upcomers 3. Warm contacted HF is withdrawn from the column through lower nozzle 8 and line 9 and is charged by pump 10 through cooler 11 and line 12 whereby cooled recirculated acid is returned to the column. Although not illustrated in this schematic flow diagram, it will usually be desirable to withdraw a small slipstream of HF from lines 9 or 12, pass it to suitable acid regeneration facilities for removal of high boiling organic sludge, and return the regenerated HF together with makeup acid to the column.

The system pressure is sufficiently high to maintain the hydrocarbon reactants and acid catalyst substantially in the liquid phase. Since the acid phase is denser than and relatively immiscible with the hydrocarbon components, phase separation will occur in each contacting zone whereby a lower acid layer 17 accumulates upon each perforated plate 2, the depth of this layer being determined by the elevation of the lower end of the next higher upcomer 3 above said plate. A continuous hydrocarbon phase or layer 18 forms above each acid layer 17 and fills the remainder of each contacting stage up to the next higher perforated plate 2. Although in accordance with the teaching of U.S. Patent 2,647,855, a column of this general type can be designed and operated so that either (I) the dense phase is continuous and the light phase discontinuous, or (II) the light phase is continuous and the dense phase discontinuous, the present invention requires that mode of operation (II) be strictly adhered to. Therefore, the HF is passed downwardly from its zone of introduction through the perforations in plates 2, raining down through successive subjacent layers of hydrocarbon 18 as a dispersed phase in countercurrent flow to the ascending hydrocarbon phase. The hydrocarbon phase is passed upwardly from each contacting zone to the next superjacent zone, through an upcomer 3, as a confined stream which is substantially free of acid globules or droplets and which is maintained out of contact with acid layer 17 in said next superjacent zone by reason of the fact that the upper end of the upcomer projects well into hydrocarbon layer 18. The upper portion of column 1 between nozzles 5 and 13 constitutes both a primary reaction section wherein the olefin-acting inorganic compound, in this instance butylene, condenses with the isobutane to yield a branched chain, 8 carbon atom molecule, and a product stripping section wherein alkyl fluorides are extracted from ascending alkylated products by descending acid. The stripped alkylated product stream, taken over head through nozzle 15 and line 16, is conventionally charged to a product fractionating column wherefrom excess isobutane is separated and returned to the instant contacting column. The lower portion of column 1 between nozzles 5 and 7 serves three functions: it constitutes a secondary reaction section wherein residual butylene dissolved in the HF is further reacted with isobutane, an acid stripping section wherein the alkylated product thus formed therein, as well as unreacted olefins, are extracted from the HF phase and carried upwardly by the rising isobutane phase into the primary reaction zone, and an isobutane acidifying section wherein a minor amount of HF is dissolved in the ascending isobutane phase. By the time the rising isobutane phase reaches the first feed injection upcomer (connecting with nozzle 5) it is saturated with HF providing a dilute nonpolar solution thereof in hydrocarbon which acts as an olefin isomerization catalyst. The fresh feed is injected into the upflowing confined stream of HF-saturated isobutane within the upcomer and is thoroughly admixed therewith. Certain olefins contained in the fresh feed, e.g., 1-butene, are catalytically isomerized to 2-butene and isobutylene in the upcomer before coming into contact with free HF droplets in the next higher contacting zones whereby condensation with isobutane then occurs. The resulting isomerized butylenes when subsequently condensed with isobutane produce a superior alkylate containing a large proportion of highly branched octanes. The fresh feed is preferably injected into two or more intermediate upcomers, such as through nozzles 5, 5', 5'', in order to maintain isomerization space velocity within reasonable limits. The fresh feed may be injected into vertically contiguous upcomers or non-contiguous upcomers; nozzles 5 and 5', or 5' and 5'', are considered as connecting with vertically contiguous upcomers 3, whereas nozzles 5 and 5'' connect with non-contiguous upcomers.

To further illustrate the advantages and benefits afforded by this invention, a specific comparative example will now be given. A commercially sized contacting column of the type depicted in the drawing is employed in the liquid phase alkylation of isobutane with butylene using a hydrofluoric acid catalyst. The column is 3.5 feet in diameter and contains 24 sieve decks spaced 12 inches apart, each provided with an upcomer. The column is operated under two different conditions designated below as Run A and Run B. In Run A the total fresh feed is introduced into an intermediate contacting stage and not into an upcomer, while in Run B the fresh feed is split and injected directly into several intermediate upcomers in accordance with the present invention.

RUN A

The fresh feed is a commercial $C_4$ fraction (depropanizer bottoms) of the following composition.

| Hydrocarbon: | Mol percent |
|---|---|
| $C_3$ | 0.6 |
| $i$-$C_4$ | 47.3 |
| $n$-$C_4$ | 23.7 |
| 1-butene | 6.0 |
| Isobutylene | 9.0 |
| 2-butene | 13.1 |
| $i$-$C_5$ | 0.3 |

The fresh feed is charged to the column at the rate of 450 bbls./day and is introduced into the hydrocarbon phase below deck No. 14, counting from the top of the column.

An isobutane stream consisting of recycle isobutane from a downstream product fractionator admixed with fresh outside isobutane and containing 92 mol percent of isobutane and 8 mol percent of n-butane, is passed to the bottom of the column at the rate of 1100 bbls./day, being introduced into the hydrocarbon phase below deck No. 24. Liquid hydrofluoric acid of 97% purity is recirculated from the bottom of the column, through a refrigerated cooler, to the top of the column at the rate of 3,000 bbls./day.

The temperatures of the incoming streams—fresh feed, isobutane and acid—are maintained at about 60° F. The column pressure is maintained at about 75 p.s.i.g., and the temperature in the alkylation zone above deck No. 15 is about 86° F. The isobutane:olefin mol ratio of the hydrocarbon entering the alkylation zone is about 9.5, and the acid:hydrocarbon volume ratio is about 1.9.

Alkylate product is withdrawn from the top of the column at the rate of about 1500 bbls./day, this rate being automatically controlled by the level of the hydrocarbon-acid interface above deck No. 1. Product analysis, obtained by Engler distillation and gas-liquid chromatography, is set forth in Tables I and II below:

RUN B

The flow rates and compositions of the several charge streams, temperature and pressure of alkylation are substantially identical to those of Run A. The same contacting column is employed except that now the fresh feed is split into five streams each at the rate of 90 bbls./day which are introduced directly into the lower sections of five intermediate upcomers extending through decks 11–15 inclusive, counting from the top of the column. Product analysis, obtained by Engler distillation and gas-liquid chromatography, is set forth in Tables I and II below:

*Table I*

TOTAL PRODUCT COMPOSITION BY BOILING RANGE

| Fraction | Weight Percent | |
|---|---|---|
| | Run A | Run B |
| $C_4$– | 82.8 | 82.9 |
| IBP–125° C | 15.6 | 16.1 |
| 125°–150° C | 0.4 | 0.2 |
| 150° C.+ | 1.2 | 0.8 |

*Table II*

DISTRIBUTION AND OCTANE RATING OF LIGHT ALKYLATE
[IBP—125° C. Fraction]

| Hydrocarbon | Weight Percent | |
|---|---|---|
| | Run A | Run B |
| $C_4$ | 0.9 | 0.5 |
| $C_5$ | 0.8 | 0.5 |
| $C_6$ | 1.7 | 1.0 |
| $C_7$ | 3.5 | 2.0 |
| Trimethylpentanes | 68.8 | 76.8 |
| Dimethylhexanes | 24.3 | 19.2 |
| | 100.0 | 100.0 |
| $Me_3/Me_2$ Weight Ratio | 2.8 | 4.0 |
| Octane Number [1] | 92.1 | 94.3 |

[1] ASTM Research O.N. clear.

From the foregoing example it will be seen that by injecting the olefinic feed into the fluid upcomers, thereby effecting a pre-isomerization thereof before alkylation, there results about a 3% weight increase in the $C_8$ fraction and, with respect to said fraction, about a 12% weight increase in its trimethylpentane content. The increased quantity of more highly branched octanes is most evident from a comparison of the trimethylpentane:dimethylhexane weight ratios: 4.0 in Run B as against 2.8 in Run A. This is further substantiated by comparing octane numbers of the light alkylate fractions: 94.3 for Run B as against 92.1 for Run A or an increase of better than 2 octane numbers. Furthermore, the weight yield of light alkylate in the total product is increased by about 0.5%, which is very substantial in view of the necessarily high $C_4$ content (corresponding to a 3.2% increase based on a debutanized product), and is attended by a decrease in heavy alkylate indicating a reduced degree of overalkylation and polymerization, both of the latter constituting undesirable side reactions.

Various structural modifications and substitutions may be made to the contacting column of this invention. For example, the perforated plates may be bubble-cap trays, grid decks, sieve decks, and the like, as are commonly employed in countercurrent extraction columns. The upcomers may be chordal sections formed by vertical baffles subtending a portion of the interior circumference of the column, or they may be simple conduits of circular or other cross-section. Two or more upcomers per deck may be provided where the hydrocarbon loading is very high. It will frequently be desirable to install in the upcomers mixing baffles such as annular rings, spaced horizontal plates, disc-and-doughnut assemblies, concentric cones, etc., at least to the extent compatible with maximum pressure drop limitations, in order to promote thorough mixing of feed and acid-saturated alkylatable material. It will be observed that the recirculating acid stream serves as a heat transfer medium or coolant which removes the exothermic heat of reaction from the upper portion of the column, so that a somehat higher acid circulation rate is required than would be needed from purely catalytic considerations; accordingly, the acid circulation rate may be reduced by providing internal cooling coils within one or more of the contacting stages above the lowermost fresh feed injection point. All of the foregoing alternative arrangements, as well as those not specifically disclosed but of similar import as will be obvious to those skilled in the art, are deemed embraced within the broad scope of this invention.

I claim as my invention:

1. In a vertically elongated contacting column having a number of vertically spaced horizontal perforated plates therein dividing the column into a plurality of contacting sections, fluid inlet and outlet means in both the uppermost and lowermost contacting sections, and a plurality of open-ended vertical fluid transfer conduits each extending through a corresponding one of said plates and terminating in adjacent contacting sections, the combination of a feed inlet conduit extending through a wall of the column and connecting directly with an intermediate one of said transfer conduits.

2. In a vertically elongated contacting column having a number of vertically spaced horizontal perforated plates therein dividing the column into a plurality of contacting sections, fluid inlet and outlet means in both the uppermost and lowermost contacting sections, and a plurality of open-ended vertical fluid transfer conduits each extending through a corresponding one of said plates and terminating in adjacent contacting sections, the combination of feed inlet means extending through a wall of the column and connecting directly with at least two intermediate transfer conduits.

3. In a vertically elongated contacting column having a number of vertically spaced horizontal perforated plates therein dividing the column into a plurality of contacting sections, fluid inlet and outlet means in both the uppermost and lowermost contacting sections, and a plurality of open-ended vertical fluid transfer conduits each extending through a corresponding one of said plates and terminating in adjacent contacting sections, the combination of feed inlet means extending through a wall of the column and connecting directly with at least two vertically contiguous intermediate transfer conduits.

4. A process for effecting the liquid phase condensation of an alkylatable material with an olefin-acting organic compound in the presence of an acid alkylation catalyst which comprises:
(1) introducing said alkylatable material into a lower one of a plurality of vertically spaced contacting zones, each zone being in restricted fluid communication with the next subjacent zone through a multiplicity of horizontally spaced apertures;
(2) flowing said alkylatable material upwardly from each zone into the next superjacent zone as a confined stream while maintaining the alkylatable material within each zone in a continuous liquid phase;
(3) introducing said acid catalyst into an upper one of said contacting zones and passing the catalyst downwardly through said horizontally spaced apertures and through successive subjacent contacting zones as a dispersed phase in countercurrent flow to said continuous phase;
(4) injecting feed stock containing said olefin-acting organic compound directly into a selected one of the resulting plurality of vertically spaced upflowing confined streams of alkylatable material which is intermediate the zones to which said alkylatable material and acid catalyst are introduced; and
(5) recovering a resultant condensation product from the uppermost of said contacting zones and withdrawing acid catalyst from the lowermost of said contacting zones.

5. The process of claim 4 further characterized in that said feed stock is injected directly into at least two intermediate upflowing confined streams of alkylatable material.

6. The process of claim 4 further characterized in that said feed stock is injected directly into at least two vertically adjacent intermediate upflowing confined streams of alkylatable material.

7. A process for effecting the liquid phase alkylation of an isoparaffinic material with an olefin in the presence of an acid alkylation catalyst which comprises:
(1) introducing said isoparaffinic material into a lower one of a plurality of vertically spaced contacting zones, each zone being in restricted fluid communication with the next subjacent zone through a multiplicity of horizontally spaced apertures;
(2) flowing said isoparaffinic material upwardly from each zone into the next superjacent zone as a confined stream while maintaining the isoparaffinic material within each zone in a continuous liquid phase;
(3) introducing said acid catalyst into an upper one of said contacting zones and passing the catalyst downwardly through said horizontally spaced apertures and through successive subjacent contacting zones as a dispersed phase in countercurrent flow to said continuous phase;
(4) injecting feed stock containing said olefin directly into a selected one of the resulting plurality of vertically spaced upflowing confined streams of isoparaffinic material which is intermediate the zones to said isoparaffinic material and acid catalyst are introduced; and
(5) removing alkylated isoparaffinic material from the uppermost of said contacting zones and withdrawing acid catalyst from the lowermost of said contacting zones.

8. The process of claim 7 further characterized in that the acid withdrawn from said lowermost zone is cooled and returned to an upper contacting zone.

9. A process for effecting the liquid phase alkylation of isobutane with butylene in the presence of hydrofluoric acid which comprises:
(1) introducing isobutane into a lower one of a plurality of vertically spaced contacting zones, each zone being in restricted fluid communication with the next subjacent zone through a multiplicity of multiplicity of horizontally spaced apertures;

(2) flowing said isobutane upwardly from each zone into the next superjacent zone as a confined stream while maintaining the isobutane within each zone in a continuous liquid phase;

(3) introducing hydrofluoric acid into an upper one of said contacting zones and passing the acid downwardly through said horizontally spaced apertures and through successive subjacent contacting zones as a dispersed phase in countercurrent flow to said continuous phase;

(4) injecting butylene-containing feed stock directly into a selected one of the resulting plurality of vertically spaced upflowing confined streams of isobutane which is intermediate the zones to which said isobutane and hydrofluoric acid are introduced; and (5) removing alkylated isobutane from the uppermost of said contacting zones and withdrawing hydrofluoric acid from the lowermost of said contacting zones.

References Cited by the Examiner
UNITED STATES PATENTS

| | | | |
|---|---|---|---|
| 2,430,333 | 11/47 | Hadden | 261—114 |
| 2,471,211 | 5/59 | Hadden | 260—683.52 |

ALPHONSO D. SULLIVAN, *Primary Examiner.*

PAUL M. COUGHLAN, *Examiner.*